(12) United States Patent
Moriiki et al.

(10) Patent No.: US 7,921,875 B2
(45) Date of Patent: Apr. 12, 2011

(54) FLUID COUPLING

(75) Inventors: Atsushi Moriiki, Higashiosaka (JP); Katsuya Nishi, Higashiosaka (JP); Yoshinori Abura, Higashiosaka (JP)

(73) Assignee: Kabushiki Kaisha Nagahori Shokai, Osaka-shi (JP)

( * ) Notice: Subject to any disclaimer, the term of this patent is extended or adjusted under 35 U.S.C. 154(b) by 282 days.

(21) Appl. No.: 12/232,725

(22) Filed: Sep. 23, 2008

(65) Prior Publication Data

US 2009/0091129 A1    Apr. 9, 2009

(30) Foreign Application Priority Data

Sep. 28, 2007  (JP) ................................. 2007-255146

(51) Int. Cl.
*F16L 37/28*    (2006.01)
(52) U.S. Cl. .............. 137/614.04; 137/614.03
(58) Field of Classification Search ........ 137/614.03–614.05; 251/149.6
See application file for complete search history.

(56) References Cited

U.S. PATENT DOCUMENTS

| 4,200,121 A |   | 4/1980 | Walter et al. |           |
|-------------|---|--------|---------------|-----------|
| 4,827,977 A | * | 5/1989 | Fink, Jr. ...................  | 137/614.04 |
| 5,401,000 A |   | 3/1995 | Tsay          |           |
| 7,028,983 B2 |  | 4/2006 | Ozaki et al.  |           |

FOREIGN PATENT DOCUMENTS

| CN | 2578650      | 10/2003 |
|----|--------------|---------|
| DE | 25 20 393    | 11/1976 |
| FR | 2 384 196    | 10/1978 |
| JP | 2001-124227  | 5/2001  |
| JP | 2002-295770  | 10/2002 |
| JP | 2005-147169  | 6/2005  |

OTHER PUBLICATIONS

Chinese Office Action issued Oct. 23, 2009 in corresponding Chinese Patent Application No. 200810168790.9.
European Search Report (in English language) issued Jan. 16, 2009 in European Patent Application No. 08165221.6.

* cited by examiner

*Primary Examiner* — Kevin L Lee
(74) *Attorney, Agent, or Firm* — Wenderoth, Lind & Ponack, L.L.P.

(57) ABSTRACT

In the fluid coupling for connecting the fluid passages of a plug (1) and a socket (2), a valve (33), a valve holder (31) and a spring (32) disposed in a compressed state between the valve (33) and the valve holder (31) are accommodated inside each of the plug (1) and the socket (2) to be connected to each other the plug (1) is inserted into the socket (2), the valve (33) of the plug (1) and the valve (33) of the socket (2) make contact with each other so that the valves (33) are retracted resisting an urging force of the spring (32). This fluid coupling further includes conical members (32, 51) which form a conical external shape along a line connecting the outside diameter portion of the valve (33) and the outside diameter portion of the valve holder (31) when the valve (33) of the plug (1) and the valve (33) of the socket (2) make contact with each other, so that the springs (32) are compressed between the valve (33) and the valve holder (31).

15 Claims, 15 Drawing Sheets

(a)

(b)

(a)

(b)

(a)

(b)

(a)

(b)

(a)

(b)

(a)

(b)

(c)

(d)

(a)

(b)

FLUID COUPLING

BACKGROUND OF THE INVENTION

1. Technical Field

The present invention relates to a fluid coupling composed of a socket and a plug.

2. Description of the Related Art

FIG. 18 shows a state in which a plug 1 and a socket 2 of a conventional fluid coupling described in Japanese Patent Laid-Open Application Nos. 2002-295770, 2001-124277 are combined and FIG. 19 shows a state in which the plug 1 and the socket 2 are separated from each other.

As shown in FIG. 19, the plug 1 has a cylindrical structure in which a fluid passage is formed in the inner surface thereof. A female screw 3 is formed in the inner surface at an end (left end in FIG. 19) of the plug 1 and a pipe is connected to this portion by thread coupling. A valve seat 4 is formed in the inner surface at the other end (right end in FIG. 19) of the plug 1. A holder stopper 5 is mounted in the center of the inner surface of the plug 1. A steel ball engagement outer peripheral groove 6 is formed in the center of the outer surface of the plug 1.

The socket 2 has a cylindrical structure in which a fluid passage is formed in the inner surface thereof and configured of a main body portion 7 on the right side and a plug insertion portion 8 on the left side in FIG. 19.

A female screw 9 is formed in the inner surface at an end (right end in FIG. 19) of the main body portion 7 of the socket 2 symmetrically with the plug 1 and other pipe is connected to this portion by thread coupling. A valve seat 10 is formed in the inner surface at the other end (left end in FIG. 19). A holder stopper 11 is mounted in the center of the inner surface of the main body portion 7.

The plug insertion portion 8 of the socket 2 has a bore to which the plug 1 is to be fitted. A stopper 8a is formed in the outer surface near an opening end (left end in FIG. 19) of the plug insertion portion 8 and a plurality of holes 12 are formed, so that steel balls 13 are accommodated in the holes 12. An O-ring 15 is mounted in an inner peripheral groove 14 formed in the center of the inner surface of the plug insertion portion 8. A sleeve 16 is fitted to the outer peripheral face of the plug insertion portion 8 and urged toward an opening end (left end in FIG. 19) by means of a spring 17. When the sleeve 16 is urged toward the opening end so that it makes contact with the stopper 8a, the inner surface of the sleeve 16 presses the steel balls 13 so that the steel balls 13 are projected into the interior of the plug insertion portion 8. When the sleeve 16 is moved in an opposite direction to the opening end or in the direction of arrow A, the steel balls 13 are retracted into the inner peripheral groove 18 formed in the inner peripheral surface of the sleeve 16.

The plug 1 and the main body portion 7 of the socket 2 each contains a valve 19, a valve holder 20 and a spring 21. The valves 19, valve holders 20 and springs 21 have the same configuration each and are disposed symmetrically. Accordingly, the valve 19, the valve holder 20 and the spring 21 of the plug 1 will be described and description of those of the socket 2 is not described.

The valve 19 is composed of a valve main body portion 22 which makes contact with the valve seat 4 of the plug 1, a projecting portion 23 which is projected outward of the opening end of the plug 1 from the vale main body portion 22 and a valve shaft 24 which is projected inward of the plug 1 from the valve main body portion 22. The outer peripheral face of the valve main body portion 22 is formed in a conical face and a valve packing 26 is mounted in an outer peripheral groove 25 therein.

The valve holder 20 is made of sintered metal and as shown in FIG. 20, configured of an annular portion 27, a cylindrical portion 28 which is located inside the annular portion 27 and longer than the annular portion 27 in the direction of a fluid passage, and a plurality of supporting portions 29 which connects the inner surface of the annular portion 27 with the outer surface of the cylindrical portion 28. The valve holder 20 is inserted into the interior of the plug 1 so that the annular portion 27 makes contact with the holder stopper 5 mounted on the inner surface of the plug 1, thereby the valve holder 20 being prevented from slipping out in the leftward direction in FIG. 19. A valve shaft 24 of the valve 19 is inserted into the interior of the cylindrical portion 28 so as to support the valve 19 such that it is slidable in the axial direction.

The spring 21 is made of a straight type coil spring and mounted on the cylindrical portion 28 of the valve holder 20 and the valve shaft 24 of the valve 19 in a compressed state, thereby urging the valve 19 such that the valve main body portion 22 of the valve 19 makes contact with the valve seat 4.

To connect the conventional fluid coupling having the above-described structure, as shown in FIG. 19, the sleeve 16 of the socket 2 is moved in the direction of arrow A resisting the urging force of the spring 21. When the plug 1 is inserted into the plug insertion portion 8 of the socket 2 with this condition, the steel balls 13 of the socket 2 are pressed by the outer peripheral face of the plug 1 and retracted into the inner peripheral groove 18 of the sleeve 16. Consequently, the plug 1 can be inserted into the plug insertion portion 8 of the socket 2. When the plug 1 is inserted up to the deep side of the plug insertion portion 8 of the socket 2, the projecting portion 23 of the valve 19 of the plug 1 presses the projecting portion 23 of the valve 19 of the socket 2. As a result, as shown in FIG. 18, the valve 19 of the plug 1 and the valve 19 of the socket 2 are retracted while pressing each other, so that the valve main body portion 22 leaves the valve seats 4, 11, so as to open the fluid passage, thereby allowing fluid to move. When the sleeve 16 is returned to an opposite side to the direction of the arrow A, the steel ball 13 leaves the inner peripheral groove 18 of the sleeve 16 and is pressed by the inner peripheral face of the sleeve 16, so that it is projected into the interior of the socket 2 from the hole 12 and engaged with the outer peripheral face of the plug 1 and then locked. Accordingly, the plug 1 is prevented from pulling out of the plug insertion portion 8 of the socket 2. Further, a gap between the plug 1 and the plug insertion portion 8 of the socket 2 is sealed with the O-ring 15 fluid-tightly.

To release coupling of the plug 1 and the socket 2, the sleeve 16 is moved in the direction of arrow A from a state shown in FIG. 18 and the plug 1 is pulled in the direction of separating the plug 1. Consequently, the steel ball is retracted into the inner peripheral groove of the sleeve 16 and unlocked, so that the plug 1 can be pulled out. When the plug 1 is separated from the socket 2, the valves 19 of the plug 1 and the socket 2 are urged by the springs 21 and advanced. Then, the valves 19 come into contact with the valve seats 4, 10 and consequently, the opening ends are closed fluid-tightly and sealing between the plug 1 and the socket 2 by the O-ring 15 is released. As a result, the plug 1 can be removed from the socket 1 without any fluid leakage.

SUMMARY OF THE INVENTION

For the fluid coupling of a piping system, no change in fluid passage diameter, an identical sectional area and a constant flow direction are ideal conditions for securing a flow rate without generating any pressure loss. However, as shown in FIG. 21, fluid flowing in from an entry passage (a) of the plug 1 passes the valve holder 20 (fluid passage (b)) of the plug 1, the spring 21 (fluid passage (c)), the outside diameter portion (fluid passage (d)) of the valve 19, a narrow portion (fluid passage (e)) of the valve 19, and a boundary portion (fluid passage (f)) of the plug 1 and the socket 2, and through a narrow portion (fluid passage (g)) of the valve 19 of the socket 2, the outside diameter portion (fluid passage (h)) of the valve 19, the spring 21 (fluid passage (i)), and the valve holder 20 (fluid passage (j)) and then, flows out from the fluid passage (k). Because of such a complicated passage, the sectional area and flow direction are changed, thereby generating a pressure loss.

Although the fluid passage (b) of the valve holder 20 on the plug 1 side is so configured that the inside diameter of its mounting portion is sufficient, the diameter of the fluid passage is reduced by not only the annular portion 27 of the valve holder 20, the cylindrical portion 28, the supporting portion 29 but also the spring 21, the valve shaft 24 of the valve 19 so that the effective opening area shown in FIG. 4(b) is provided. The effective opening area can be reduced to ¼ or less its proper area. Thus, the fluid passage sectional area is reduced by the fluid passage (b) of the valve holder 20, thereby increasing the fluid passage resistance.

Although Japanese Patent Application Laid-Open No. 2001-124277 has proposed a type in which the valve holder is formed by sheet metal processing, it has such a problem that the strength of the leg portion is weak. Further, the valve shaft cannot be guided stably because the valve shaft of the valve is passed through the valve holder having a small thickness, so that vibration is generated and durability is low. For this reason, the device proposed in Japanese Patent Application Laid-Open No. 2001-124277 can be used as nothing but a fluid coupling for a small diameter passage.

In the fluid passage (c) of the spring 21, the flow is disturbed by its coil. In an area from the fluid passage (c) of the spring 21 to the fluid passage (d) of the outside diameter portion of the valve 19, reduction of the flow is generated. In an area from the fluid passage (d) of the outside diameter portion of the valve 19 to the fluid passage (e) of the narrow portion of the valve 19, a change of the flow is generated.

Because the diameters of the fluid passage (e) of the narrow portion of the valve 19 and a boundary portion (f) are small, the fluid passage sectional area is reduced thereby increasing the fluid passage resistance.

The same problem occurs on the socket 2 side. An expansion of the flow is generated in an area from the fluid passage (d) of the outside diameter portion of the valve 19 to the fluid passage (c) of the spring 21, thereby generating a vortex and increasing the fluid passage resistance.

The fluid coupling has such a complicated fluid passage and thus, some extent of the pressure loss needs to be accepted. However, in the market, a low pressure loss type fluid coupling having a small fluid passage resistance to secure a large flow rate has been demanded.

Accordingly, a first object of the present invention is to provide a low pressure loss type fluid coupling having a large effective opening area and a valve holder which never reduces flow strength.

A second object of the present invention is to provide a low pressure loss type fluid coupling having a spring which never generates a disturbance, reduction and expansion of the flow.

A third object of the present invention is to provide a low pressure loss type fluid coupling in which the diameter of the narrow portion of the valve is large.

To achieve the above-described objects, as a first aspect, the present invention provides a fluid coupling in which a valve, a valve holder and a spring for urging the valve so that the valve makes pressure contact with a valve seat formed on the inner peripheral face of the socket are accommodated inside each of a plug and a socket to be connected to each other liquid-tightly. When the plug is inserted into the socket, the valve of the plug and the valve of the socket make contact with each other so that the valves are retracted resisting an urging force of the spring to connect the fluid passage of the plug with the fluid passage of the socket. Each of the plug and the socket further comprise: a conical member which form a conical external shape along a line connecting the outside diameter portion of the valve and the outside diameter portion of the valve holder when the valve of the plug and the valve of the socket make contact with each other so that the springs are compressed between the valve and the valve holder.

The conical member having a conical outside diameter along a line connecting the outside diameter portion of the valve with the outside diameter portion of the valve holder when the valve of the plug and the valve of the socket make contact with each other so as to compress the springs is provided between the valve and the valve holder. Consequently, the reduction and expansion of the flow due to a difference of step in the fluid passage seen in the conventional art are eliminated, thereby eliminating collision of fluid and generation of the vortex, so as to reduce the pressure loss.

As a specific means, preferably, the conical member is formed of a conical coil spring which constitutes the spring; the small diameter portion of the conical coil spring has substantially the same diameter as the outside diameter of the annular portion which supports the spring and through which the valve shaft of the valve passes; the large diameter portion of the conical coil has substantially the same diameter as the outside diameter portion of the valve; and when the valve of the plug and the valve of the socket make contact with each other so as to compress the springs, the coils of the conical coil springs approach each other.

The small diameter portion of the conical coil has substantially the same diameter as the outside diameter of the annular portion of the valve holder and the large diameter portion has substantially the same diameter as the outside diameter portion of the valve. Thus, no extreme contraction of the flow is generated in a passage from the spring to the valve outside diameter portion on the plug side and no extreme expansion of the flow is generated in a passage from the valve outside diameter portion to the spring on the socket side and no vortex is generated. Further, when the valve of the plug and the valve of the socket make contact with each other so that the springs are compressed, the coils of the conical coil springs approach each other, thereby not disturbing the flow in the fluid passage of the spring.

As other means, preferably, the conical member is formed of a conical cup; the small diameter portion of the conical cup has substantially the same diameter as the outside diameter of the annular portion which supports the spring of the valve holder and through which the valve shaft of the valve passes; the large diameter portion of the conical cup has substantially the same diameter as the outside diameter of the valve; and when the valve of the plug and the valve of the socket make contact with each other so as to compress the springs, the outside diameter portions of the conical cup and the valve approach each other.

Because the small diameter portion of the conical cup has substantially the same diameter as the outside diameter of the annular portion of the valve holder and the large diameter portion has substantially the same diameter as the large diameter portion of the valve, no extreme reduction of the flow is generated in a passage from the spring to the valve outside diameter portion on the plug side and no extreme expansion of the flow is generated in a passage from the valve outside diameter portion to the spring on the socket side and no vortex is generated. Further, when valve of the plug and the valve of the socket make contact with each other so as to compress the springs, the conical cup and the outside diameter portion of the valve approach each other thereby not disturbing the flow between the conical cup and the valve.

Preferably, when the valve of the plug and the valve of the socket make contact with each other so that the springs are compressed, the fluid passage is formed to be substantially parallel to the outer peripheral face of the conical member.

Consequently, the flow of fluid between the conical member and the inner face of the fluid passage can be smoothed.

Preferably, the valve holder is provided integrally with a cap portion on the bottom wall of the conical cup to constitute a bombshell type member and the bombshell type member forms a streamlined shape.

Because the valve holder forms the streamlined shell type member, no collision is generated between the valve holder and the fluid when the fluid enters, thereby a smooth entry of the fluid being attained. Further, when the fluid flows out, generation of the vortex is suppressed, so that the fluid flows out under a small resistance.

Preferably, the valve holder is provided integrally with supporting legs for supporting the valve holder in each of the plug and the socket.

By providing the valve holder integrally with the supporting legs, the number of components can be reduced so as to reduce manufacturing cost.

Preferably, the valve holder is provided separately from supporting legs for supporting the valve holder in each of the plug and the socket and wherein the supporting legs are constituted of linear material disposed between an inner peripheral groove formed in the inner peripheral face of each of the plug and the socket and the valve holder.

Because the supporting legs are made of linear material, initial investment for investment for molds and the like can be reduced and further, because the effective opening area is increased by decreasing the volume of the supporting legs so as to reduce the fluid passage resistance, the fluid flows smoothly.

Preferably, the spring is disposed in a compressed state between the inner peripheral groove formed in the inner peripheral face of each of the plug and the socket and the valve holder, so that the valve is urged through the valve holder so as to make pressure contact with the valve seat, and wherein the valve holder is composed of linear material and the end portion held by the valve holder is formed in a semi-spherical shape.

Because the valve holder is made of linear material, the initial investment for investment for molds and the like can be reduced and further, because the fluid passage resistance is reduced by decreasing the volume of the supporting legs so as to increase the effective opening area, the fluid flows smoothly.

By forming the end portion of the valve in the semi-spherical shape, no collision is generated between the valve and the fluid when the fluid flows in, and thereby a smooth flow-in of the fluid can be attained. When the fluid flows out, generation of the vortex is suppressed, so that the fluid flows out under a small resistance.

Preferably, the spring and the valve holder are provided integrally.

By providing the spring and the valve holder integrally, the number of components can be reduced so as to reduce manufacturing cost.

As a second aspect of the present invention, preferably, the valve is composed of a conical face, a peripheral groove formed in the conical face and a sealing member mounted in the peripheral groove and the sealing member is mounted inside of an extension line of the conical face via a caulking portion provided in the peripheral groove.

Because the sealing member is mounted inside of the extension line of the conical face, even if the valve is urged by the spring and the valve makes contact with the valve seat when the valves are moving toward the opening ends of the plug and the socket, the sealing member never makes contact with the valve seat with a large resistance, and consequently, the valves can move smoothly.

Preferably, the periphery of the caulking portion has an inclination.

Consequently, even if the valve makes contact with the valve seat while the valve is urged by the spring and moves toward the opening end, the valve likely slips with respect to the valve seat and thus, the valve can move smoothly.

Preferably, the valve is composed of a conical face, a peripheral groove formed in the conical face and a sealing member mounted in the peripheral groove and the sealing member is formed at the same time as the valve and mounted inside of an extension line of the conical face.

The sealing member is molded at the same time as the valve and mounted on the valve via the caulking portion. Therefore, the sealing member can be mounted on the valve according to plural methods.

Preferably, when the valve of the plug and the valve of the socket are separated from each other so that the springs are expanded, the sealing member makes contact with a seat face formed at a connecting portion between the cylindrical face of an opening portion of each of the plug and the socket and the conical face of the conical valve seat continuous from the opening portion, so that the sealing member is pressed inward in a radial direction.

Because the sealing member keeps contact with the seat face, receiving a force directed inward in a radial direction, an action of balancing forces is exerted. Consequently, a stable sealing condition can be attained such that the center lines of the plug and the socket are aligned with each other.

Preferably, the large diameter portion outside of the sealing member having the conical face makes contact with the valve seat of the fluid passage.

Because the large diameter portion located outside of the sealing member makes contact with the valve seat of the fluid passage, the diameter of the fluid passage inward of the sealing member can be increased.

As a third aspect of the present invention, preferably, the valve holder is composed of the annular portion and a plurality of leg portions which are extended radially such that they are bent from the outer periphery of the annular portion and supported by the fluid passage and the leg portion is provided with a rib bent in a L shape as seen in the direction of the fluid passage.

If the valve holder is viewed along the direction of the fluid passage, the spring is hidden by the annular portion and the ribs are hidden by the leg portions and thus, only the annular portion and the leg portions disturb the fluid passage. Thus, the effective opening area is large. Because the leg portions are reinforced by the ribs, the strength is intensified. Further, the ribs can rectify the flow in the fluid passage.

Preferably, a rise-up portion is provided on the annular portion of the valve holder so as to guide the valve shaft of the valve by means of the inner face of the rise-up portion while the spring is guided by the outer face of the rise-up portion.

Consequently, the valve shaft can be guided stably and the spring can be held securely.

Preferably, the end in the fluid passage direction of the rib of the valve holder is brought into contact with the fluid passage while the other end in the fluid passage direction is brought into contact with the annular portion.

Consequently, the ribs serve as a stay for the leg portions, thereby intensifying the strength of the leg portions of the valve holder.

Preferably, the rib of the valve holder is brought into contact with the valve shaft of the valve.

Consequently, when the valve shaft of the valve is moved, the valve shaft can be guided by the ribs, thereby ensuring a secure opening/closing motion of the valve.

According to a first aspect of the present invention, the conical member extends from the annular portion of the valve holder to the outside diameter portion of the valve, thereby generating no extreme reduction or expansion of the fluid flow and no vortex is generated. As a result, the fluid passage resistance is reduced. When the conical spring, which is an embodiment of the conical member, is compressed, the coils of the conical coil spring approach each other. Consequently, the flow is not disturbed in the fluid passage of the spring, and thereby the fluid passage resistance is reduced so as to decrease the pressure loss.

According to a second aspect of the present invention, as the sealing member is mounted inside of the extension line of the conical face, even if the valve is urged by the spring and the valve makes contact with the valve seat when the valves are moving toward the opening ends of the plug and the socket, the sealing member never makes contact with the valve seat with a large resistance, and consequently, the valves can move smoothly. Also, the large diameter portion outside of the packing makes contact with the valve seat of the fluid passage. Thus, the diameter of the fluid passage inward of the packing can be increased, so that the pressure loss at the narrow portion of the valve can be reduced.

According to the third aspect of the present invention, only the annular portion and the leg portions are provided if the valve holder is viewed along the fluid passage direction. As a result, the effective opening area is increased and the pressure loss can be reduced. Because the leg portion is reinforced by the rib, the strength for supporting the spring is never dropped and generation of vibration is suppressed and the durability is improved. Thus, the valve holder can be applied to a fluid coupling having a large diameter and high pressure. Further, the flow of the fluid is rectified by the ribs, and thereby the flow of the fluid is uniformized.

DETAILED DESCRIPTION OF THE INVENTION

Hereinafter, the embodiments of the present invention will be described with reference to the accompanying drawings.

Figure 1:
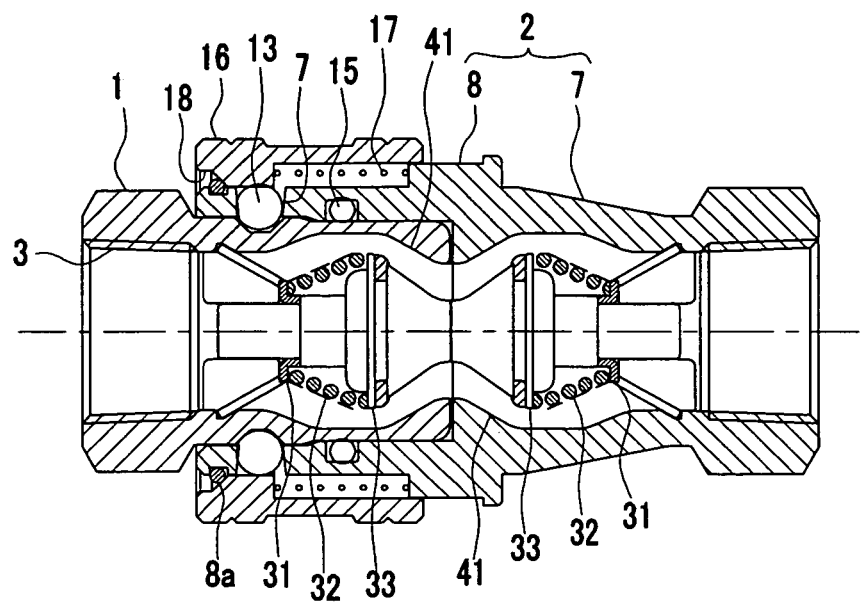
FIG. 1 is a sectional view of a fluid coupling of a first embodiment of the present invention when it is coupled.
Figure 2:
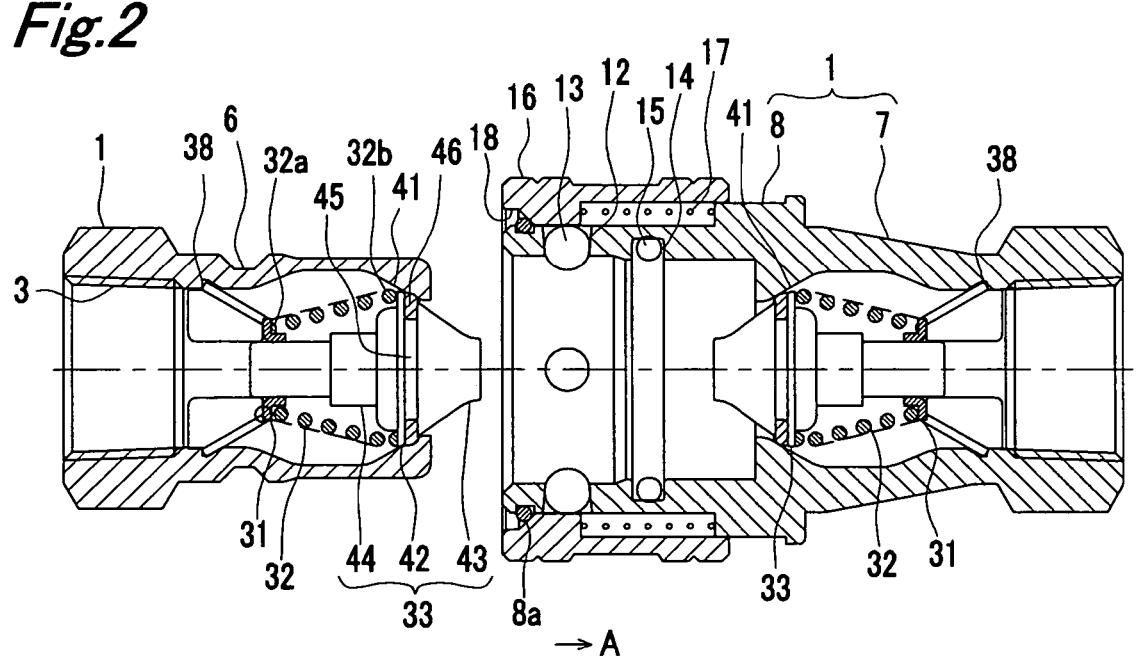
FIG. 2 is a sectional view of the fluid coupling of the present invention of FIG. 1 when it is separated.

FIG. 1 shows a state in which a plug and a socket of a fluid coupling according to the first embodiment of the present invention are combined and FIG. 2 shows a state in which the plug and the socket are separated.

Figure 18:
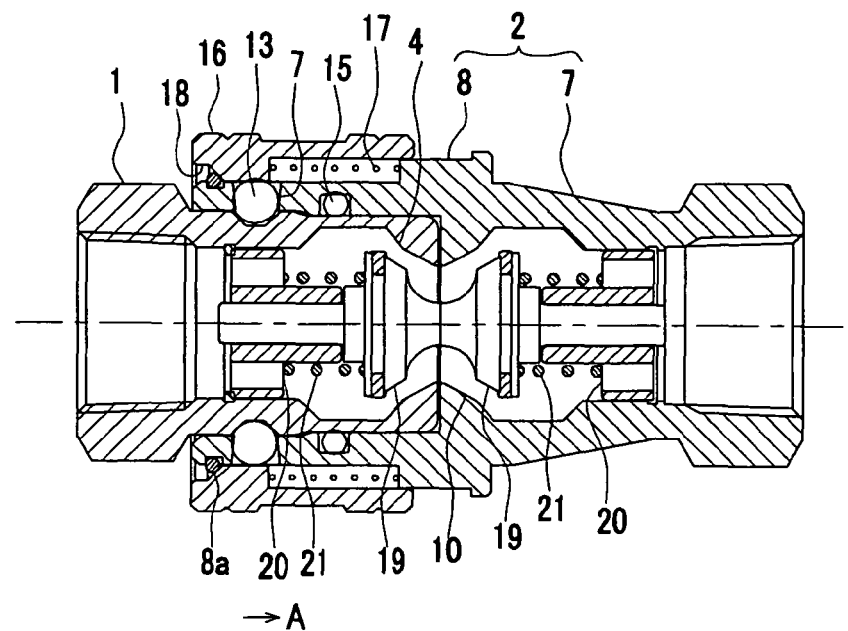
FIG. 18 is a sectional view of a conventional fluid coupling when it is coupled.
Figure 19:
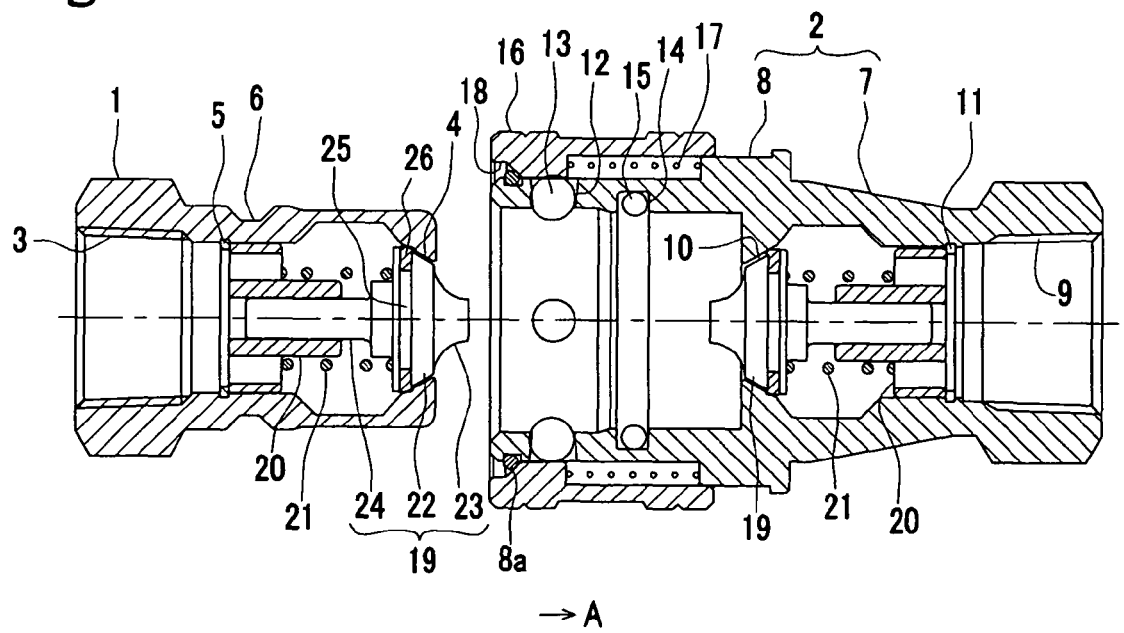
FIG. 19 is a sectional view of the conventional fluid coupling when it is separated.
Figure 20:
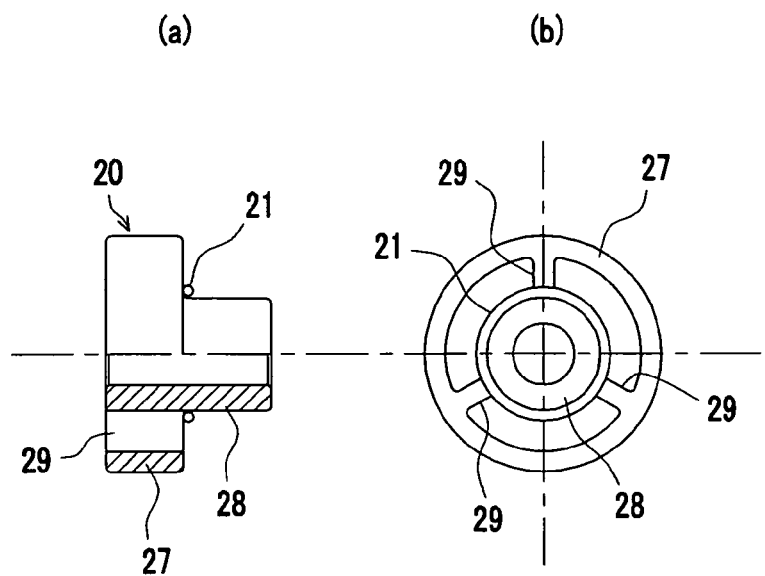
FIG. 20(a) is a side partially sectional view of the valve holder of the conventional fluid coupling of FIG. 18
FIG. 20(b) is a front view thereof.
Figure 21:
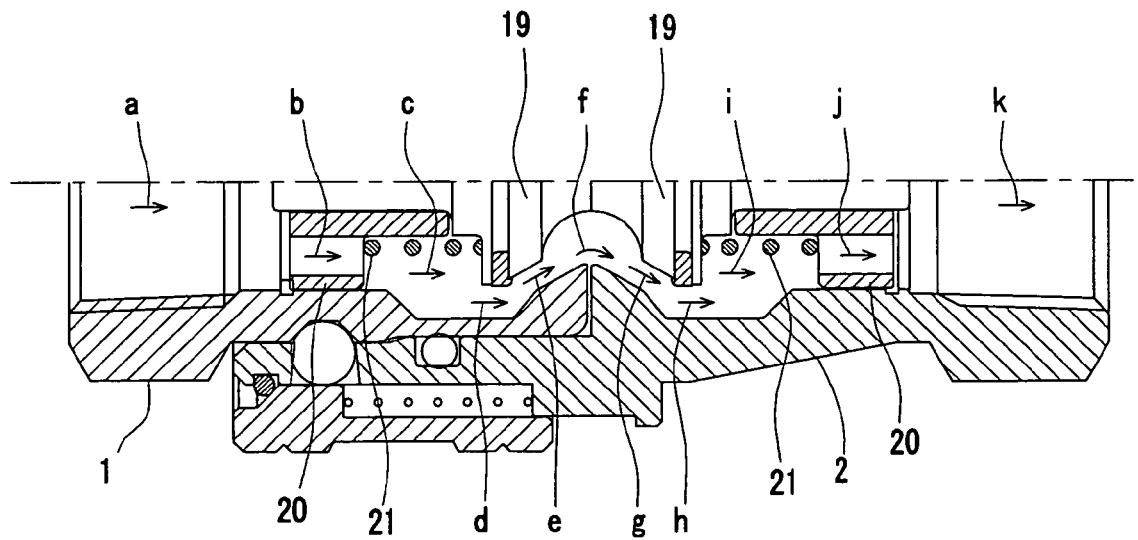
FIG. 21 is a sectional view showing a passage of the conventional fluid passage of FIG. 18.

The plug 1 and socket 2 in FIGS. 1 and 2 are substantially the same as the plug and socket of the conventional fluid coupling shown in FIGS. 18 and 19 except part of the configuration of the fluid passage and thus corresponding portions are suffixed with like reference numerals and description thereof is not repeated. Hereinafter, a valve holder 31, a spring 32 and a valve 33 inside the plug 1 will be described. Those inside the socket 2 have the same configuration as those of the plug 1 and they are disposed symmetrically with each other. Like reference numerals are attached and description of like components is not repeated. In the meantime, in a description of the components inside the plug 1, the downstream side and upstream side of the fluid passage are expressed as "forward" and "rearward" respectively and the central portion side and the outer peripheral portion side are expressed as "inside" and "outside" respectively for convenience of the description.

Figure 3:
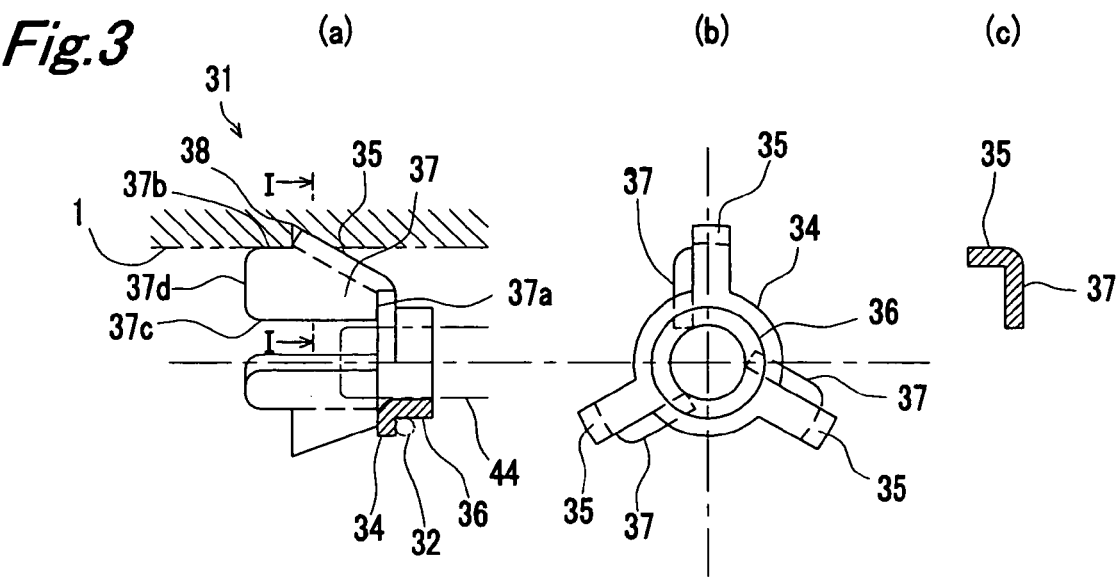
FIG. 3(a) is a side view of a valve holder of the fluid coupling of the present invention of FIG. 1.
FIG. 3(b) is a front view thereof and FIG. 3(c) is a sectional view of a leg taken along the line I-I of FIG. 3(a)

FIG. 3 shows an embodiment of the valve holder 31. The valve holder 31 is composed of an annular portion 34, and a plurality (three in the example) of leg portions 35. The valve holder 31 is formed by sheet metal processing, i.e. by pressing sheet material such as stainless steel, but instead may be formed of sintered metal.

The annular portion 34 is a donut-like plate and a cylindrical rise-up portion 36, which rises up toward the valve 33, is formed on the inner peripheral edge thereof. This rise-up portion 36 has an inside diameter in which a valve shaft 44 of the valve 33, which will be described later, is inserted so as to guide the valve shaft 44 and an outside diameter on which a spring 32 is mounted so as to guide the spring 32. The rise-up portion 36 may be constituted of rectangular projecting pieces rising up from plural positions (preferably three positions) on the inner peripheral edge of the annular portion 34 instead of being cylindrical.

The leg portions 35 are extended radially such that they are bent at about 60° backward from the outer peripheral edge of the annular portion 34. The leg portion 35 has a rib 37 which is bent at 90° inward in a substantially L shape (see FIG. 3(c)) as seen from the fluid passage direction, on one side edge thereof. The rib 37 has a front edge 37a extending in parallel to the annular portion 34 from the proximal end of the leg portion 35, an outer edge 37b extending in parallel to the fluid passage from the front end of the leg portion 35, an inner edge 37c extending in parallel to the center line of the valve holder 31 from the front end of the front edge 37a and a rear edge 37d extending in parallel to the annular portion 34 toward the inner edge from the front end of the outer edge 37b. The inner edge 37c of the rib 37 coincides with the inside diameter of the rise-up portion 36 of the annular portion 34. The front edge 37a of the rib 37 makes contact with the rear face of the annular portion 34. The outer edge 37b of the rib 37 makes contact with the wall face of the fluid passage while the front end of the leg portion 35 engages with an inner peripheral groove 38 formed in the fluid passage.

Figure 4:
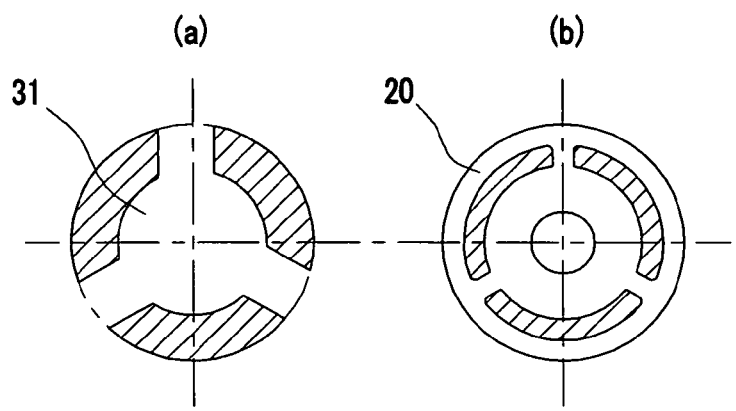
FIGS. 4(a) and 4(b) are front views showing the effective opening area of the valve holder of FIG. 3 and a conventional valve holder.

When the valve holder 31 having the above-described structure is viewed from the fluid passage direction, the rib 37 is bent in an L shape from the leg portion 35, so that it is not projected largely from the rib 37. The spring 32 is hidden by the annular portion 34. Thus, the fluid passage is not disturbed by the rib 37. The spring 32 and the effective opening area of the valve holder 31, as viewed from the fluid passage direction, is larger than the effective opening area of the conventional valve holder 20 shown in FIG. 4(b) as indicated with hatching in FIG. 4(a), thereby securing up to about 50%.

The rib 37 of the valve holder 31 forms an L-shaped section at right angle to the fluid passage together with the leg portion 35. Consequently, the section modulus increases so as to secure a strength resisting the reaction force of the spring 32. When the front end of the leg portion 35 is engaged with the inner peripheral groove 38 in the fluid passage, the front edge 37a of the rib 37 makes contact with the rear face of the annular portion 34 while the outer edge 37b makes contact with the wall face of the fluid passage. Consequently, the rib 37 takes a role of a stay between the fluid passage and the wall face so as to increase the supporting strength.

The valve shaft 44 of the valve 33 is guided by the rise-up portion 36 of the valve holder 31 and the spring 32 is positioned and held. Because the valve shaft 44 of the valve 33 is guided by the rise-up portion 36, erection of the valve 33 is maintained so as to prevent generation of vibration of the valve 33. Further, a long section of the valve shaft 44 of the valve 33 is guided by the rise-up portion 36 and the inner edge 37c of the rib 37, so that the valve 33 can be stabilized further thereby providing a fluid coupling having a small vibration and a long service life.

The annular portion 34 of the valve holder 31 may have substantially the same diameter as the outside diameter of the spring 32 because it only needs to hold the spring 32. Thus, the area of the annular portion 34 as viewed from the fluid passage direction can be minimized whereby increasing the effective opening area further.

Because the valve holder 31 is made by sheet metal processing, it can be manufactured at a cheap cost easily.

Figure 5:
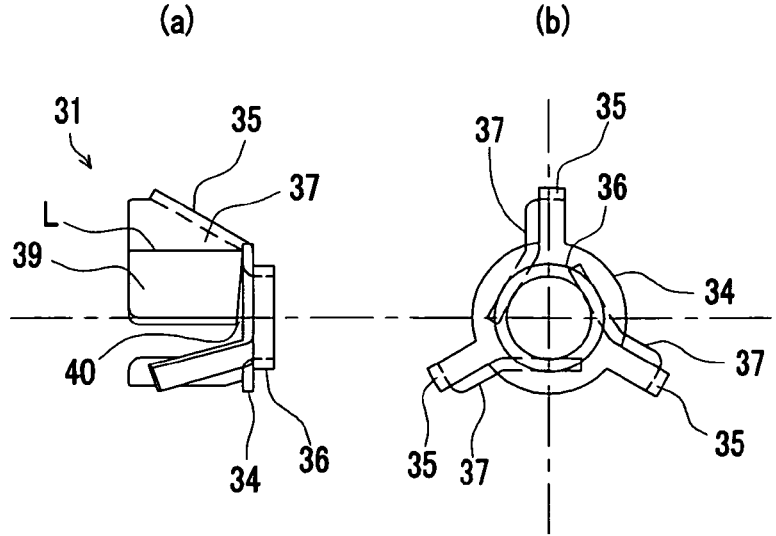
FIGS. 5(a) and 5(b) are a side view and a front view respectively showing a first modification of the valve holder of FIG. 3.

FIG. 5 shows a first modification of the valve holder 31 of FIG. 3. According to the first modification, a substantially half portion of the front end portion of the rib 37 is bent further along a breaking line L parallel to the central axis and the inner face of a bent portion 39 is brought into contact with the inside diameter of the rise-up portion 36, thereby guiding the valve shaft 44 of the valve 33 inserted through the rise-up portion 36. Thus, the valve shaft 44 of the valve 33 can be guided further stably.

According to the first modification, a gap 40 is provided between the front edge 37a of the rib 37 and the annular portion 34. Consequently, when the front end of the leg portion 35 is mounted in the inner peripheral groove 38 in the fluid passage, the outside diameter of the leg portion 35 can be reduced, thereby facilitating mounting of the valve holder 31 in the fluid passage.

Figure 6:
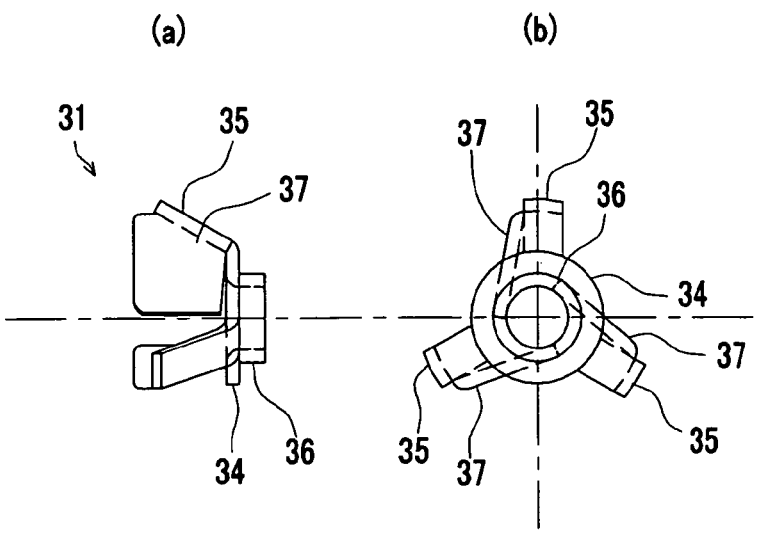
FIGS. 6(a) and 6(b) are a side view and a front view respectively showing a second modification of the valve holder of FIG. 3.

FIG. 6 shows a second modification of the valve holder 31 of FIG. 3. Although in the first modification, the rib 37 is bent at about 90° from the leg portion 35 and further, the half portion of the front end portion of the rib 37 is bent, according to this second modification, the rib 37 is bent at a slightly larger angle than 90° from the leg portion 35 such that the valve 33 inserted through the rise-up portion 36 is brought into contact with the valve shaft 44. Consequently, the number of bending treatments is reduced thereby facilitating the manufacturing.

Figure 7:
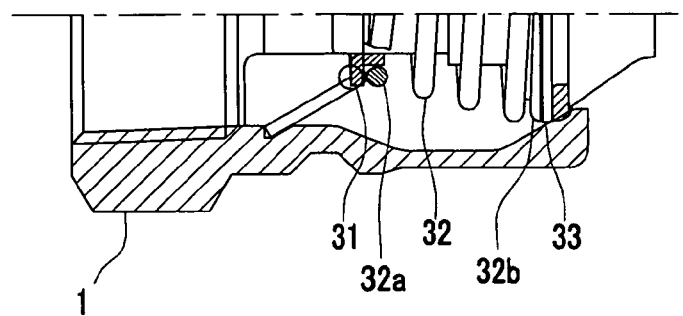
FIGS. 7(a) and 7(b) are sectional views showing the condition of the spring when the fluid coupling is separated and coupled respectively.
Figure 7:
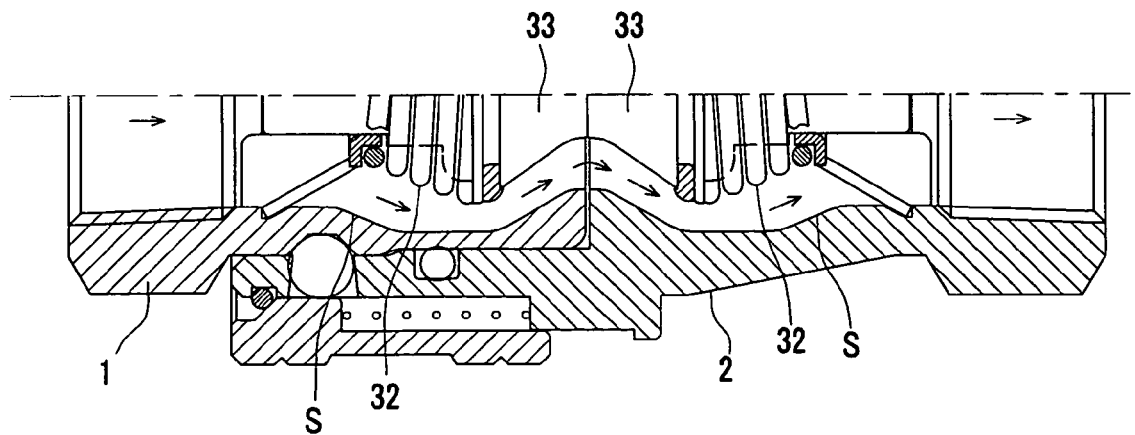

FIG. 7 shows the shape and arrangement of the spring 32. The spring 32 constitutes a conical member of the present invention. The spring 32 is made of a conical coil spring. The small diameter portion 32a of the conical coil spring is substantially the same as the outside diameter of the annular portion 34 of the valve holder 31 and the large diameter portion 32b is substantially the same as the outside diameter portion of the valve 33. The spring 32 is mounted in a compressed state between the valve holder 31 and the valve 33. Before the plug 1 and the socket 2 are connected (FIG. 7(a) shows only the plug 1), an interval of the coil is large. However, if the plug 1 and the socket 2 are connected so that the valve 33 of the plug 1 and the valve 33 of the socket 2 come into contact with each other so as to compress the springs 32, the conical coil springs are brought close to each other. Consequently, the outer faces of the conical coil springs constitute a fluid passage thereby not disturbing a flow of fluid. Because the valve holder 31 and the outside diameter of the valve 33 are made into a continuous form by the spring 32, reduction or expansion of flow due to a difference of step of the fluid passage seen in a conventional art is eliminated, thereby eliminating collision of fluid and generation of vortex so as to reduce pressure loss.

By forming a wall face S of the fluid passage formed by the spring 32 and opposing plug 1 when they are connected, substantially parallel to the conical face formed by the outer face of the coil of the spring 32, the flow resistance can be reduced and the pressure loss can be reduced. Further, it is preferable to form a smooth surface fluid passage by chamfering the corner of the fluid passage.

Figure 8:
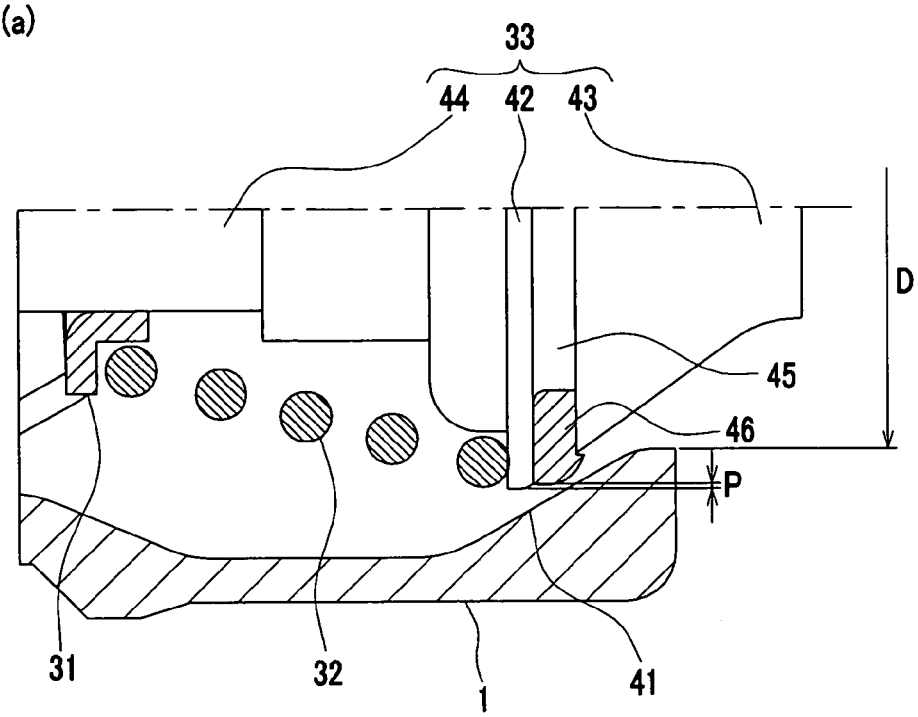
FIGS. 8(a) and 8(b) are sectional views showing the positions of the valve and valve seat of the fluid coupling of the present invention and the conventional fluid coupling.
Figure 8:
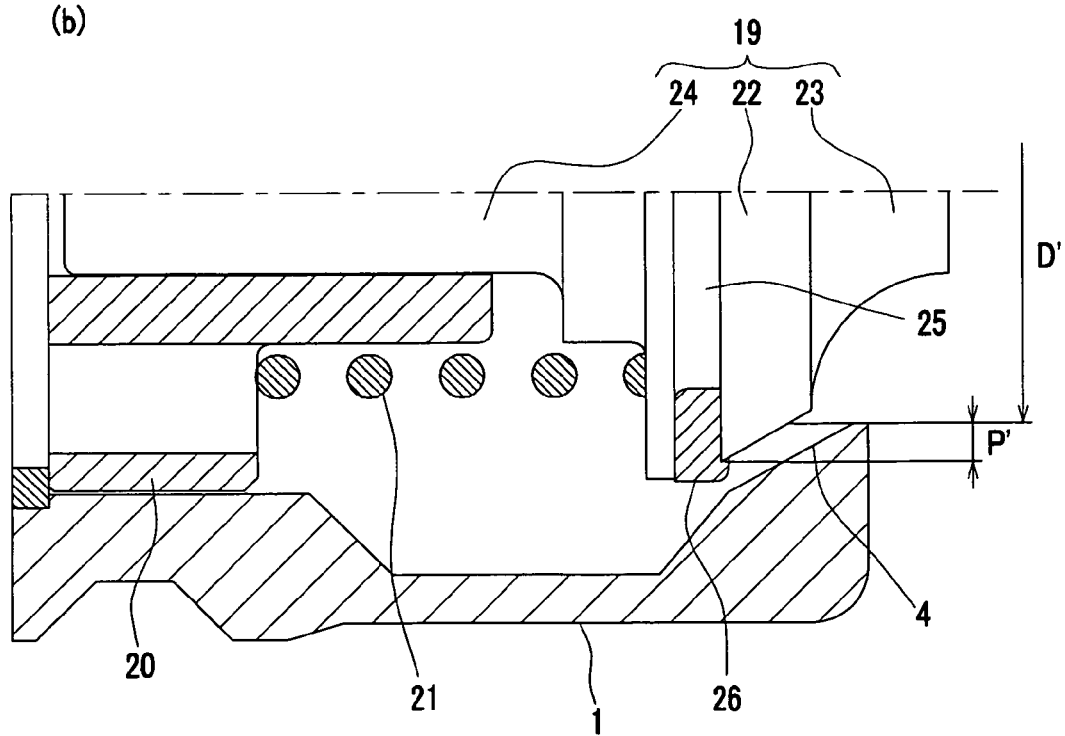

FIG. 8(a) shows the relationship between the valve 33 of the plug 1 and its valve seat 41. The valve 33 is composed of a valve main body portion 42 which makes contact with the valve seat 41 of the plug 1, a projecting portion 43 which is projected outward of the opening end of the plug 1 from the valve main body portion 42 and a valve shaft 44 projected inward of the plug 1 from the valve main body portion 42. The outer peripheral face of the valve main body portion 42 is formed of a conical face and a valve packing 46 which is a sealing member 58 is mounted in the outer peripheral groove 45. A contact face P of the valve main body portion 42 with the valve seat 41 is located outside of the valve packing 46. Therefore, the valve 33 of the present invention is different from the conventional valve 19, in which a contact face P' of the valve main body portion 22 with the valve seat 4 is located inside of the valve packing 26.

Because the conventional valve 19 of FIG. 8(b) needs to secure the valve seat 4 inside of the valve packing 26, a diameter D' of the opening portion of the plug 1 cannot be enlarged. Contrary to this, according to the present invention, the valve seat 41 is located outside of the valve packing 46. Consequently, a greater degree of freedom in the shape and dimension of the opening portion of the plug 1 inside of the valve packing 46 is created, so that the diameter D of the plug 1 can be enlarged up to the vicinity of the valve packing 46. As a result, the fluid passage can be enlarged thereby reducing the pressure loss.

Although the above-described structure belongs to the plug 1, the socket 2 is disposed symmetrically, thereby providing the same operation and effect.

Second Embodiment

Figure 9:
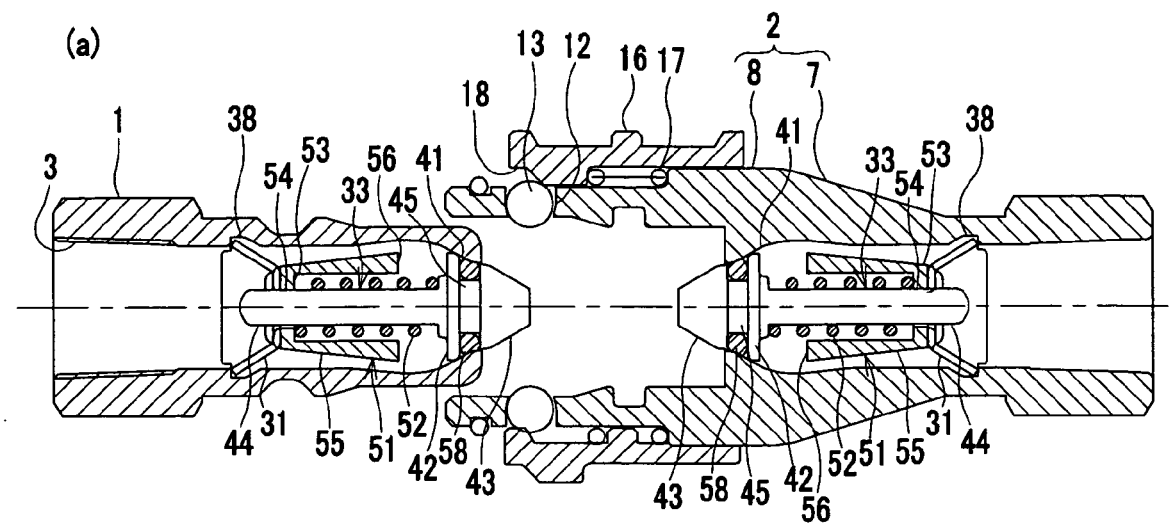
FIGS. 9(a) and 9(b) are sectional views of the fluid coupling of the second embodiment of the present invention when it is separated and when it is coupled respectively.
Figure 9:
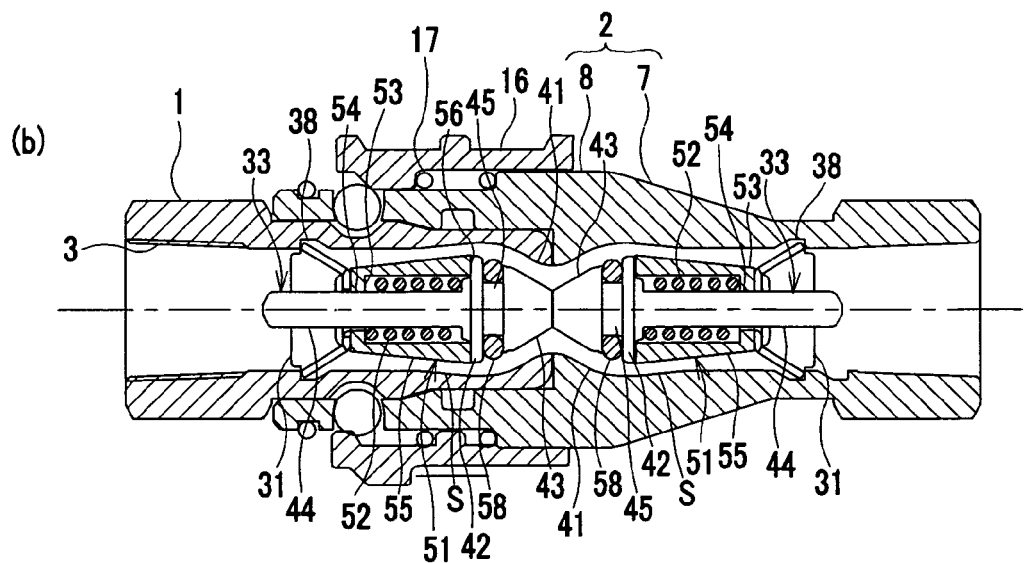

FIG. 9 shows the plug 1 and the socket 2 of the second embodiment. Like reference numerals are suffixed to the same components as in the first embodiment of FIG. 1 and description thereof is not repeated.

The plug 1 and the socket 2 have a conical cup 51 between the valve main body portion 42 of the valve 33 and the valve holder 31 and a spring 52 for urging the valve 33 is provided inside of the conical cup 51. The conical cup 51 constitutes the conical member of the present invention.

The conical cup 51 has a bottom wall 53 which makes contact with the top face of the valve holder 31 and the bottom wall 53 has an insertion hole 54 through which the valve shaft 44 of the valve 33 passes. The conical cup 51 has a peripheral wall 55 which is extended toward the valve main body portion 42 from the periphery edge of the bottom wall 53. As a valve holder, the valve holder 31 of the second modification shown in FIG. 6 is used.

The spring 52 is mounted in a compressed state between the inner face of the bottom wall 53 of the conical cup 51 and the valve 33 so that the bottom wall 53 of the conical cup 51 is pressed against the valve holder 31, so as to prevent the conical cup 51 from being rattled. Before the plug 1 and the socket 2 are coupled, as shown in FIG. 9(a), an edge portion 56 of the conical cup 51 and the valve main body portion 42 of the valve 33 are disposed with an interval. However, if as shown in FIG. 9(b), the plug 1 and the socket 2 are coupled so that the valve 33 of the plug 1 and the valve 33 of the socket 2 make contact with each other so as to compress the springs 52, the edge portion 56 and the valve main body portion 42 are brought close to each other. Consequently, the outer surface of the conical cup 51 constitutes a fluid passage thereby not disturbing the flow. Further, the conical cup 51 and the valve 33 form a continuous structure, so that reduction or expansion of the flow due to a difference of step in the fluid passage seen in the conventional art is eliminated, thereby eliminating collision of fluid and generation of vortex, so as to reduce the pressure loss. Further, by forcing a wall face S formed by the conical cup 51 and opposing plug 1 when they are coupled, substantially parallel to the conical face formed by the outer face of the conical cup 51, the flow resistance can be reduced and the pressure loss can be reduced.

Figure 10:
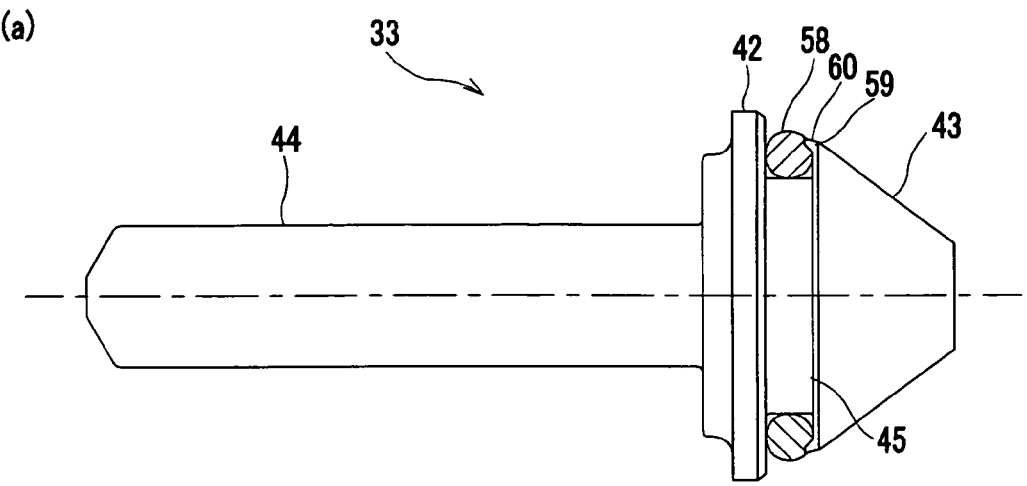
FIGS. 10(a) and 10(b) are a sectional view of the valve shown in FIG. 9 and a partially enlarged sectional view thereof respectively.
Figure 10:
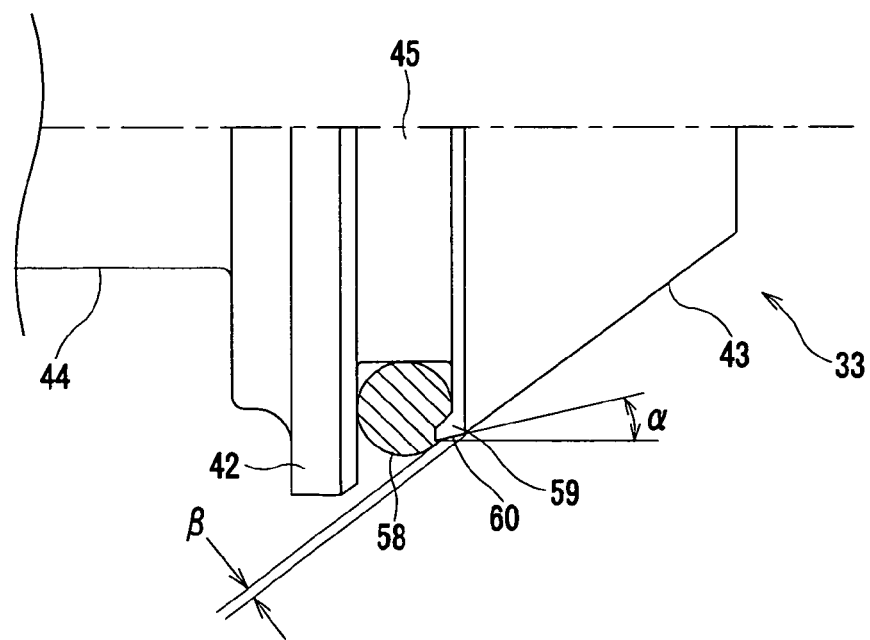

As shown in FIG. 10(a), a sealing member 58 is mounted on the outer periphery 45 of the valve 33. The sealing member 58 is formed of elastic body such as rubber. The sealing member 58 is mounted such that it is pressed inward by a caulking portion 59 provided on the bottom edge of the projecting portion 43. As shown in FIG. 10(b), an outer peripheral face 60 of the caulking portion 59 is formed at an angle α with respect to the valve shaft 44. Even if the valve 33 comes into contact with the valve seat 41 when the valve 33 is urged by the spring 52 and moved toward the opening end portion, the valve 33 slips easily with respect to the valve seat 41 thereby the valve 33 being moved smoothly.

Further, the sealing member 58 is mounted with a distance β inward of an extension line extended from the inclined surface of the projecting portion 43. Consequently, even if the valve 33 comes into contact with the valve seat 41 when the valve 33 is urged by the spring 52 and moved toward the opening end, the sealing member 58 is kept from making contact with the valve seat 41 with a large resistance, whereby the valve 33 being moved smoothly.

Figure 11:
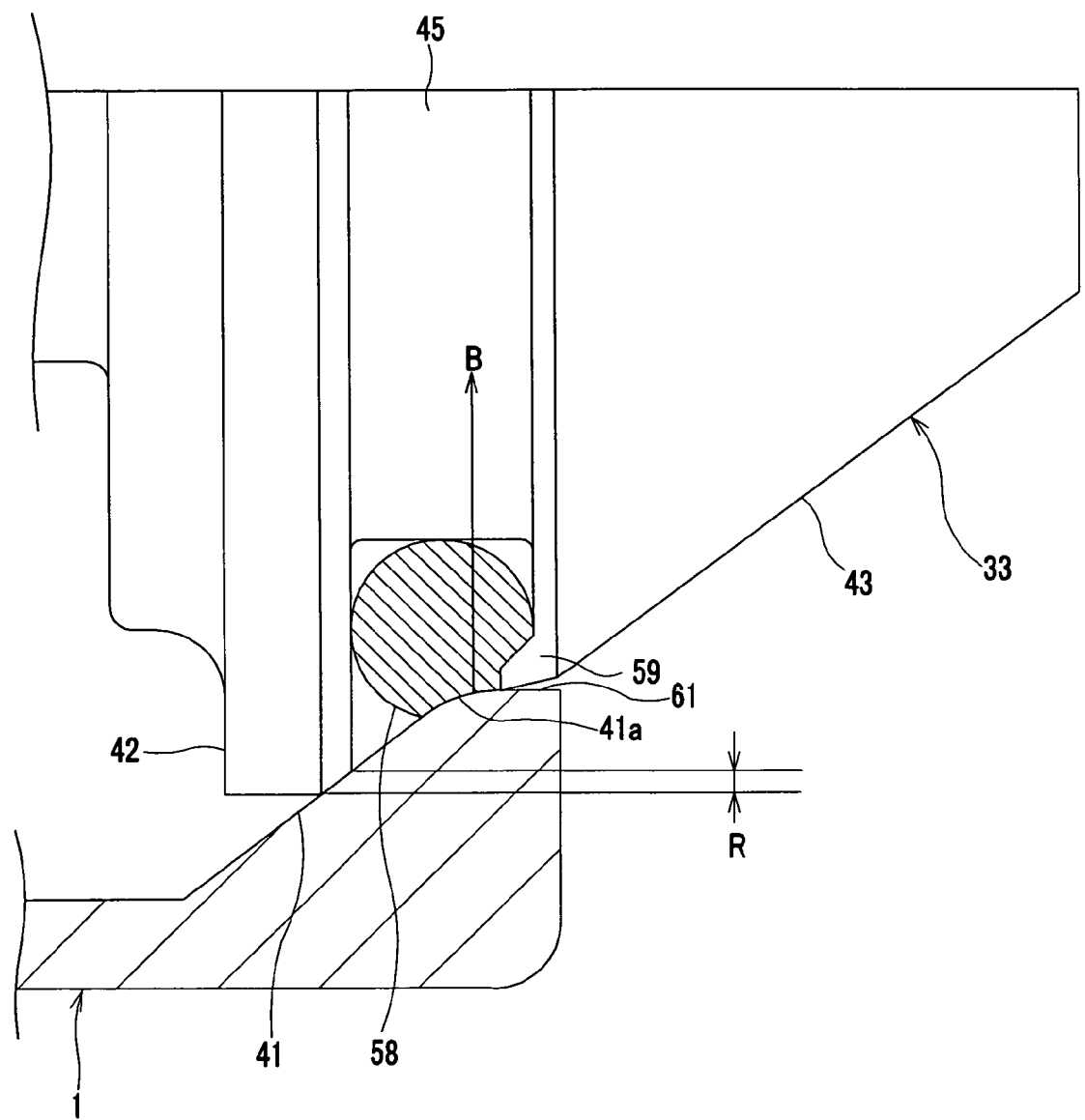
FIG. 11 is a partially enlarged sectional view showing a state in which the valve of FIG. 10 makes contact with the valve seat.

FIG. 11 shows the relationship between the valve 33 of the plug 1 and the valve seat 41. A contact face R of the valve main body portion 42 with they valve seat 41 is located outside of the sealing member 58. Because the valve seat 41 is located outside of the sealing member 58, a freedom is generated in the shape and dimension of the opening end of the plug 1 inside of the sealing member 58, so that the diameter D of the opening end of the plug 1 can be enlarged up to the vicinity of the sealing member 58. As a result, the fluid passage can be enlarged and the pressure loss can be reduced.

In a state that the plug 1 is closed, the sealing member 58 makes contact with a seat face 41a formed at a connecting portion between the cylindrical face of the opening portion 61 of the plug 1 and the conical face of the valve seat 41, so that the sealing member 58 is compressed in the direction of arrow B. As a result, the sealing member 58 receives a force directed inward in a radius direction, so that an action attempting to balance the force is exerted whereby a stabilized sealing condition being secured with the center lines of the plug 1 and the valve 33 aligned with each other.

Figure 12:
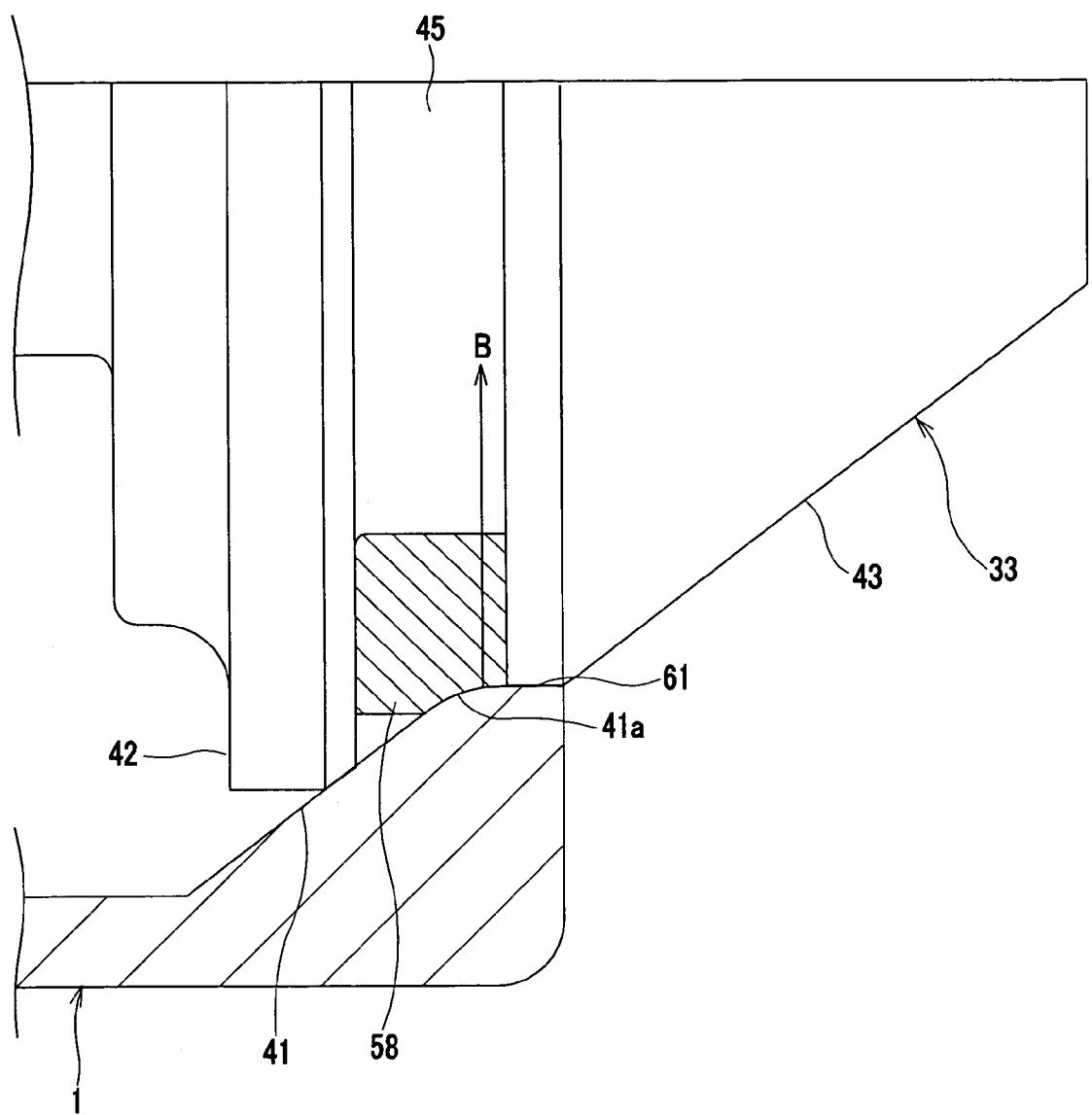
FIG. 12 is a partially enlarged sectional view showing a variation of the sealing member.

The sealing member 58 may not be mounted to the valve 33 via the caulking portion 59 as long as the sealing member 58 is mounted inside of the extension line extended from the inclined face of the projecting portion 43 and kept in contact with the seat face 41a of the plug 1 when the plug 1 is closed, so that it is compressed in the direction of arrow B. If the sealing member 58 having a square section is mounted to the valve 33 by simultaneous forming method as shown in FIG. 12, the same effect can be obtained.

Third Embodiment

Figure 13:
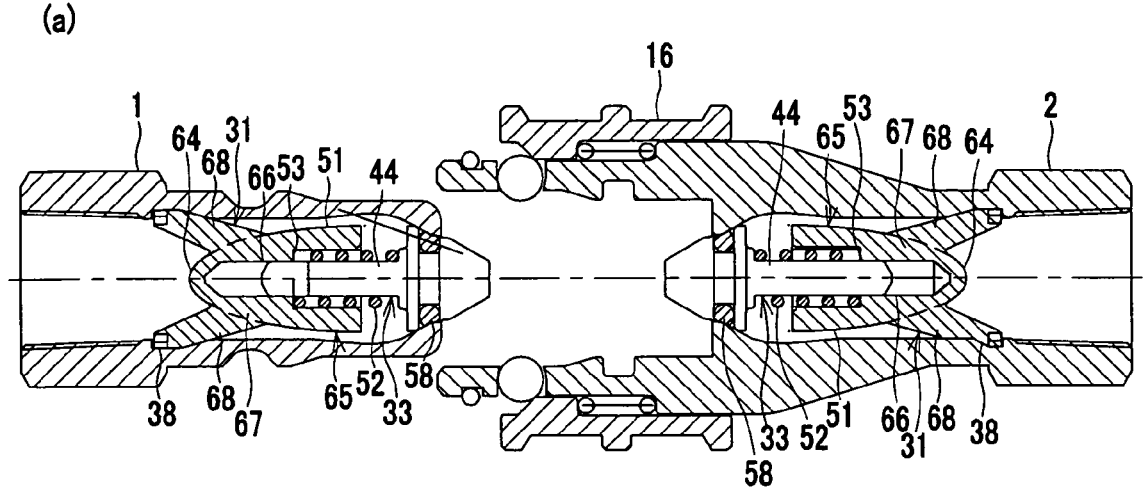
FIGS. 13(a) and 13(b) are sectional views of the fluid coupling of the third embodiment of the present invention when it is separated and it is coupled respectively.
Figure 13:
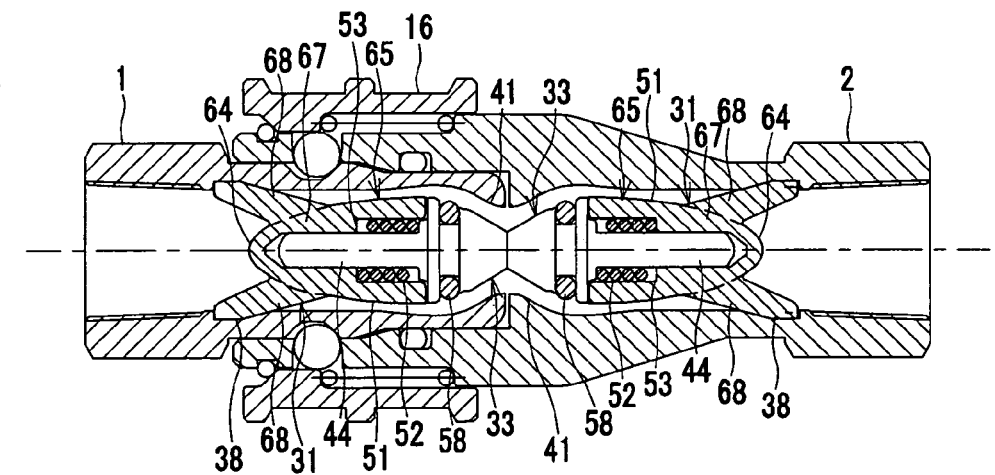

FIG. 13 shows the plug 1 and the socket 2 of the third embodiment. Like reference numerals are suffixed to the same components as the second embodiment of FIG. 9 and description thereof is not repeated.

The plug 1 and the socket 2 contain a bombshell type member 65 in which the streamlined valve holder 31 is provided integrally with the bottom wall 53 of the conical cup 51. This valve holder 31 contains a body 67 which supports the valve shaft 44 of the valve 33 passing through a hollow portion 66 therein and having a cap portion 64, and two pieces of supporting legs 68 which are extended from the body 67 so as to engage with the inner peripheral groove 38 to support the valve holder 31, the body 67 and the leg portions 68 being provided integrally. By forming the streamlined structure by providing the body 67 with the cap portion 64 integrally, no collision between the cap portion 64 and fluid is generated when fluid flows in, thereby securing a smooth entry of fluid. Further, when fluid flows out, generation of the vortex is suppressed, so that fluid can flow out with a small resistance.

Next, instead of the supporting legs 68 provided integrally with the body 67, a valve holder 31 having a holder spring 70 as a supporting portion separated from the body 67 may be adopted. The body 67 of this valve holder 31 has a step portion 71 which makes contact with the holder spring 70.

Figure 14:
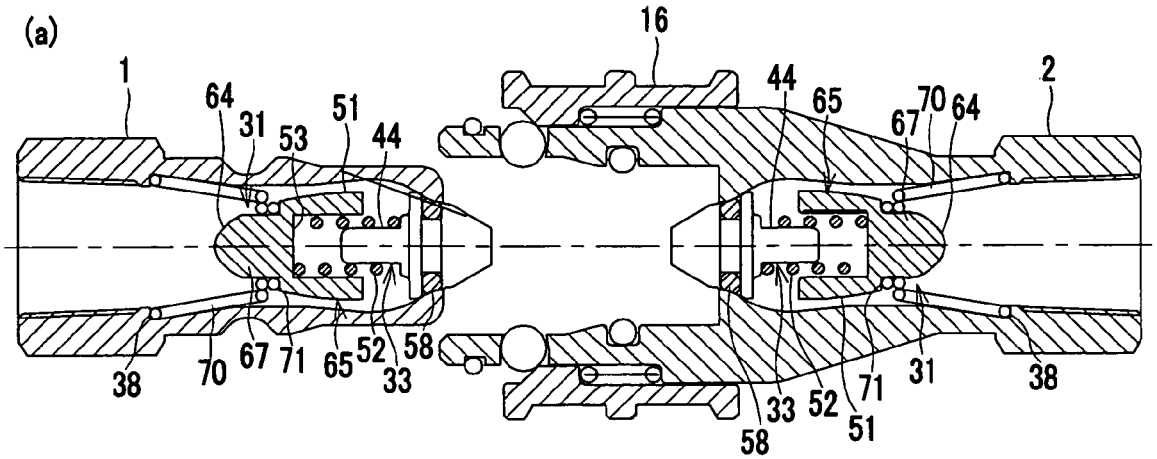
FIG. 14(a) is a sectional view of the fluid coupling according to a modification of the valve holder shown in FIG. 13.
FIG. 14(b) is a sectional view of the fluid coupling when it is coupled.
FIG. 14(c) is a side view of the valve holder and FIG. 14(d) is a top view thereof.
Figure 14:
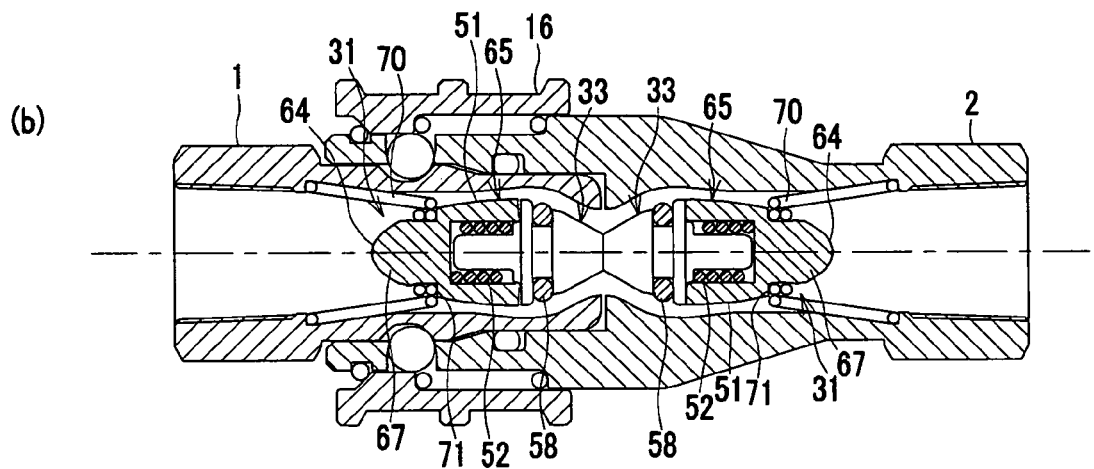
Figure 14:
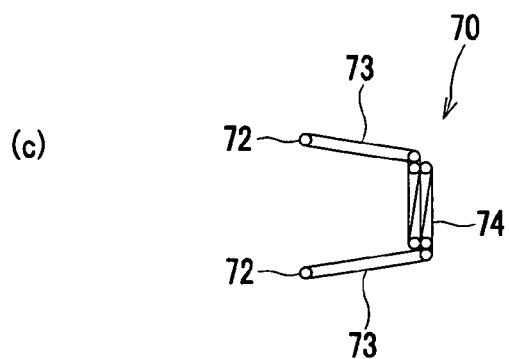
Figure 14:
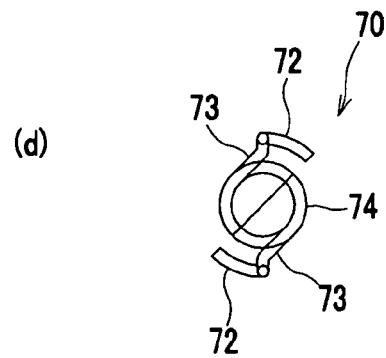

As shown in FIG. 14(c), the holder spring 70 which makes contact with the step portion 71 is composed of an end winding portion 72 which engages the inner peripheral groove 38, a connecting portion 73 which rises up from the end winding portion 72 and an annular holding portion 74 which is continuous from the connecting portion 73, making contact with the step portion 71 so as to hold the shell type member 65. Providing of the end winding portion 72 intensifies an engagement with the inner peripheral groove 38 so as to secure stability of the holder spring 70. Further, by using linear material for the holder spring 70, initial investments for investment for molds and the like can be reduced. Additionally, by using the linear material for the holder spring 70, the volume of the holder spring 70 can be reduced to increase the effective opening area. As a result, the fluid passage resistance is decreased thereby fluid flowing smoothly.

Fourth Embodiment

Figure 15:
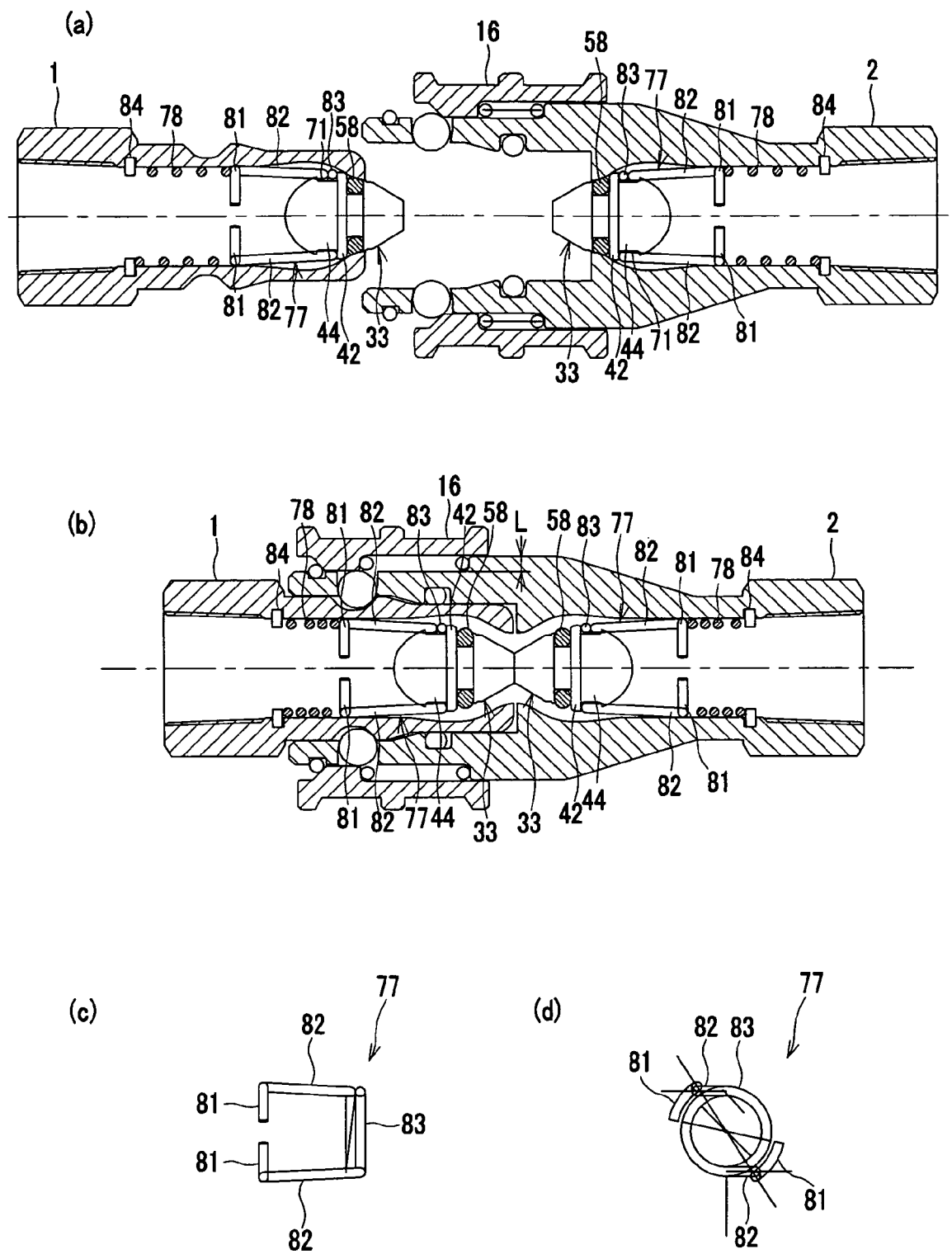
FIG. 15(a) is a sectional view of the fluid coupling of the fourth embodiment of the present invention when it is separated.
FIG. 15(b) is a sectional view of the fluid coupling when it is coupled.
FIG. 15(c) is a side view of the valve holder and FIG. 15(d) is a top view thereof.

FIG. 15 shows the plug 1 and the socket 2 of the fourth embodiment. Like reference numerals are suffixed to the same components as the second embodiment of FIG. 9 and description thereof is not repeated.

The valve 33, a valve supporting body 77 and a valve spring 78 are accommodated inside of the plug 1 and the main body portion 7 of the socket 2.

An end portion of the valve shaft 44 of the valve 33 on an opposite side to the valve main body portion 42 is formed in a semi-spherical shape. Formation into the semi-spherical shape blocks generation of collision between the valve shaft 44 and fluid when fluid enters, thereby securing a smooth flow-in of the fluid. Further, when fluid flows out, generation of the vortex is suppressed, so that fluid flows out with a small resistance.

The valve supporting body 77 constitutes a valve holder of the present invention. As shown in FIG. 15(c), the valve supporting body 77 is composed of an end winding portion 81 which makes contact with the valve spring 78 described later, a connecting portion 82 which rises up from the end winding portion 81 and a holding portion 83 which is continuous from the connecting portion 82 so as to engage with the step portion 71 of the valve 33 so as to hold the valve 33. Providing of the end winding portion 81 intensifies the contact with the valve spring 78 so as to secure a stability of the valve supporting body 77.

The valve supporting body 77 is formed of linear material. Use of the linear material can reduce initial investments for investment for molds and the like. Further, use of the linear material can reduce the volume of the valve supporting body 77 to increase the effective opening area. Consequently, the fluid passage resistance is reduced, thereby fluid flowing smoothly.

The valve spring 78 is a known spring and is disposed between the end winding portion 81 of the valve supporting body 77 and the valve spring supporting groove 84 provided in the fluid passage such that it can be expanded or contracted.

Figure 16:
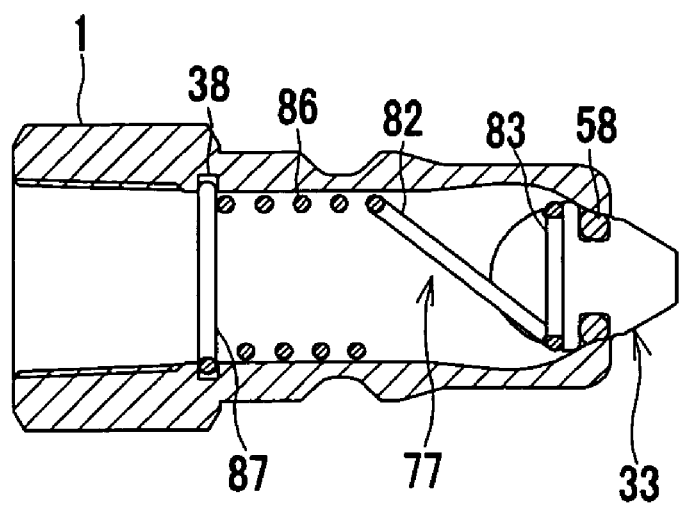
FIG. 16(a) is a sectional view of the plug having a valve holder provided integrally with the valve spring of FIG. 15
FIG. 16(b) is a side view of the valve holder.
Figure 16:
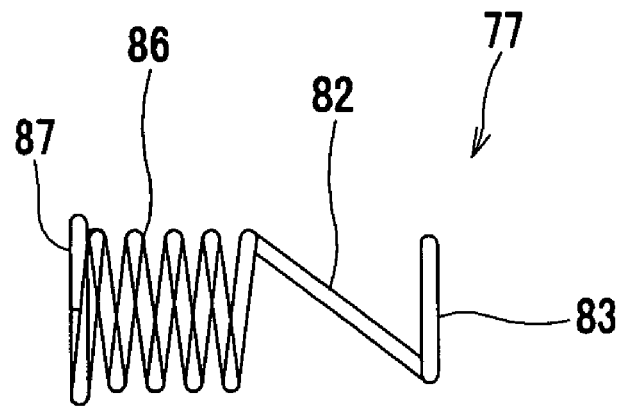

Although in the above-described embodiment, the valve supporting body 77 for holding the valve 33 and the valve spring 78 are provided separately, it is permissible to provide the valve supporting body 77 and the valve spring 78 integrally so as to form the valve supporting body 77 as shown in FIG. 16. This valve supporting body 77 is composed of a spring portion 86 which can be expanded or contracted, a connecting portion 82 which is continuously extended from the spring portion 86 and a holding portion 83 for holding the valve 33. An end portion 87 on an opposite side to the connecting portion 82 of the spring portion 86 has a larger diameter than the other spring portion 86 and is engaged with the inner peripheral groove 38 provided in the inner diameter of the plug 1 so as to hold the valve supporting body 77. The connecting portion 82 is provided with an angle with respect to the holding portion 83 and the spring portion 86. The holding portion 83 is wound in a substantially ¾ turn to ⅞ turn.

By providing the valve supporting body 77 and the valve spring 78 integrally so as to constitute the valve supporting body 77, the number of components is reduced and manufacturing cost is reduced. Because the spring portion 86 is formed along the inner peripheral face of the plug 1 and the socket 2, a space is formed in the central portion, serving as a fluid passage. Consequently, the effective opening area is increased thereby fluid flowing smoothly. Because the connecting portion 82 is made of circular linear material and the number of winding is one, an increase of the fluid passage resistance can be prevented.

Figure 17:
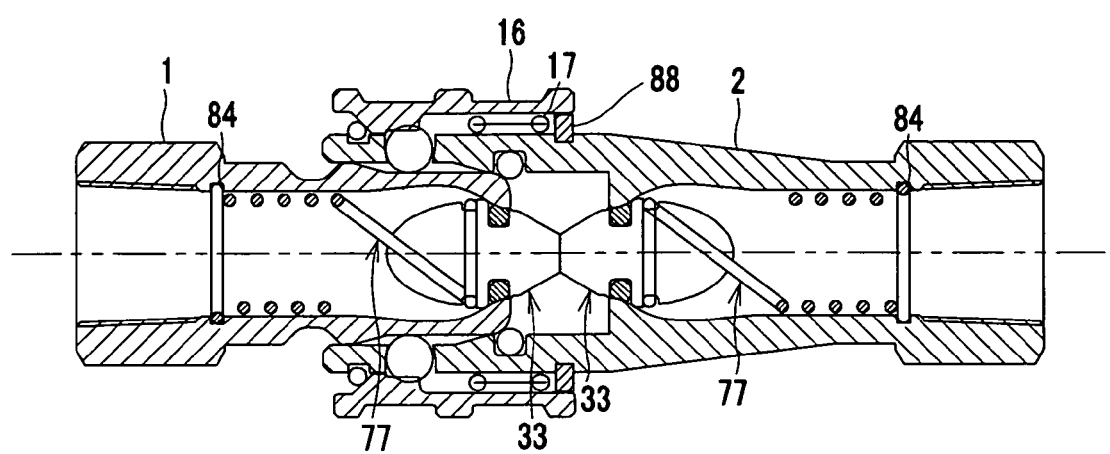
FIG. 17 is a sectional view showing a state in which a C-type ring is mounted on a fluid coupling having the plug of FIG. 16.

As shown in FIG. 17, a C-type ring 88 which supports an end of the spring 17 may be mounted between the outer peripheral face of the socket 2 and the sleeve 16. Consequently, the outside diameter can be reduced only by a dimension L as compared with a case where an end of the spring 17 is supported by the step portion as shown in FIG. 15(b). As a result, the outside diameter of the socket 2 main body can be reduced, whereby saving materials for use and reducing the manufacturing cost.

EXPLANATION OF REFERENCE NUMERALS

1 Plug
2 socket
31 valve holder
32 spring (conical member)
32a small diameter portion
32b large diameter portion
33 valve
34 annular portion
35 leg portion
36 rise-up portion
37 rib
40 gap
41 valve seat
42 valve main body portion
44 valve shaft 45 outer peripheral groove
46 valve packing (seal member)
51 conical cup (conical member)
53 bottom wall
58 sealing member
59 caulking portion
60 outer peripheral face
64 cap portion
65 bombshell type member
68 supporting leg
77 valve supporting body (valve holder)
78 valve spring (spring)

The invention claimed is:

1. A fluid coupling comprising a plug and a socket that are connectable to each other in a liquid-tight manner,
   the plug including a valve, a valve holder and a spring accommodated inside of the plug, the spring being adapted to apply an urging force to the valve so that the valve makes pressure contact with a valve seat formed on an inner peripheral face of the plug,
   the socket including a valve, a valve holder and a spring accommodated inside of the socket, the spring being adapted to apply an urging force to the valve so that the valve makes pressure contact with a valve seat formed on an inner peripheral face of the socket,
   wherein when the plug is inserted into the socket, the valve of the plug and the valve of the socket make contact with each other so that the valves are retracted so as to resist the urging force of the springs to connect the fluid passage of the plug with the fluid passage of the socket,
   wherein each of said springs is a conical coil spring that forms a conical external shape along a line connecting an outside diameter portion of the valve and an outside diameter portion of the valve holder when the valve of the plug and the valve of the socket make contact with each other so that the springs are compressed between the valve and the valve holder,
   wherein each of the conical coil springs has a small diameter portion and a large diameter portion,
   wherein the small diameter portion of the conical coil spring has substantially the same diameter as the outside diameter of an annular portion which supports the spring and through which a valve shaft of the corresponding valve passes,
   wherein the large diameter portion of the conical coil spring has substantially the same diameter as an outside diameter of the corresponding valve, and
   wherein, when the valve of the plug and the valve of the socket make contact with each other so as to compress the conical coil springs, coils of the conical coil spring in the plug approach each other and coils of the conical coil spring in the socket approach each other.

2. The fluid coupling according to claim 1, wherein when the valve of the plug and the valve of the socket make contact with each other so that the springs are compressed, the fluid passage is formed to be substantially parallel to the outer peripheries of the conical coil springs.

3. The fluid coupling according to claim 1, wherein the valve holder is provided integrally with supporting legs for supporting the valve holder in each of the plug and the socket.

4. The fluid coupling according to claim 1, wherein the valve holder is provided separately from supporting legs for supporting the valve holder in each of the plug and the socket, and wherein the supporting legs are constituted of linear material disposed between an inner peripheral groove formed in an inner peripheral face of each of the plug and the socket and the valve holder.

5. The fluid coupling according to claim 1, wherein the spring is disposed in a compressed state between an inner peripheral groove formed in an inner peripheral face of each of the plug and the socket and the valve holder, so that the valve is urged through the valve holder into pressure contact with the valve seat, and wherein the valve holder is composed of linear material and an end portion held by the valve holder is formed in a semi-spherical shape.

6. The fluid coupling according to claim 5, wherein the spring and the valve holder are provided integrally.

7. The fluid coupling according to claim 1, wherein the valve is composed of a conical face, a peripheral groove formed in the conical face and a sealing member mounted in the peripheral groove and the sealing member is mounted inside of an extension line of the conical face via a caulking portion provided in the peripheral groove.

8. The fluid coupling according to claim 7, wherein a periphery of the caulking portion has an inclination.

9. The fluid coupling according to claim 1, wherein the valve is composed of a conical face, a peripheral groove formed in the conical face and a sealing member mounted in the peripheral groove and the sealing member is formed at the same time as the valve and mounted inside of an extension line of the conical face.

10. The fluid coupling according to claim 7, wherein when the valve of the plug and the valve of the socket are separated from each other so that the springs are expanded, the sealing member makes contact with a seat face formed at a connecting portion between a cylindrical face of an opening portion of each of the plug and the socket and the conical face of the conical valve seat continuous from the opening portion, so that the sealing member is pressed inward in a radius direction.

11. The fluid coupling according to claim 10, wherein the large diameter portion outside of the sealing member having the conical face makes contact with the valve seat of the fluid passage.

12. The fluid coupling according to claim 1, wherein the valve holder is composed of the annular portion and a plurality of leg portions which are extended radially such that they are bent from an outer periphery of the annular portion and supported by the fluid passage and each of the leg portions is provided with a rib bent in a L shape as seen in a direction of the fluid passage.

13. The fluid coupling according to claim 12, wherein a rise-up portion is provided on the annular portion of the valve holder so as to guide the valve shaft of the valve by means of an inner face of the rise-up portion while the spring is guided by an outer face of the rise-up portion.

14. The fluid coupling according to claim 12, wherein an end in the fluid passage direction of the rib of the valve holder is brought into contact with the fluid passage while the other end in the fluid passage direction is brought into contact with the annular portion of the valve holder.

15. The fluid coupling according to claim 12, wherein the rib of the valve holder is brought into contact with the valve shaft of the valve.

* * * * *